United States Patent
Yamamoto

(10) Patent No.: US 11,726,633 B2
(45) Date of Patent: Aug. 15, 2023

(54) DISPLAY APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Tatsuya Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 16/934,268

(22) Filed: Jul. 21, 2020

(65) Prior Publication Data

US 2021/0041994 A1    Feb. 11, 2021

(30) Foreign Application Priority Data

Aug. 5, 2019  (JP) .............................. JP2019-143921

(51) Int. Cl.
    *G06F 3/0482*  (2013.01)
    *G06Q 50/02*   (2012.01)
    *A01B 76/00*   (2006.01)

(52) U.S. Cl.
    CPC ............ *G06F 3/0482* (2013.01); *A01B 76/00* (2013.01); *G06Q 50/02* (2013.01)

(58) Field of Classification Search
    CPC .... G06F 3/0482; G06F 3/04845; G06F 9/451; G06F 16/538; G06F 16/535; G06F 16/532; G06F 16/54; G06F 3/04842; G06T 19/20; G06Q 50/02
    See application file for complete search history.

(56) References Cited

U.S. PATENT DOCUMENTS

2016/0078570 A1*  3/2016  Ethington .............. G06Q 10/06
                                                           705/7.21
2017/0337642 A1* 11/2017  Stuber ................... G06Q 50/02

FOREIGN PATENT DOCUMENTS

JP     2009-245128 A    10/2009
JP     2018-151770 A     9/2018

* cited by examiner

*Primary Examiner* — Hau H Nguyen
(74) *Attorney, Agent, or Firm* — Venable LLP

(57) ABSTRACT

This invention provides an apparatus having an acquisition unit for acquiring data representing a measured value concerning a cultivation situation in a farm field, and a display control unit for displaying the measured value, wherein if the result of aggregating the measured value represented by the data for each attribute value of a first attribute is displayed and a user selects a first attribute value of the first attribute, the display control unit aggregates the measured value having the first attribute value, for each attribute value of a second attribute, and displays the measured value, and if the user selects a second attribute value of the second attribute, the display control unit aggregates the measured value having the second attribute value of the second attribute, for each attribute value of the first attribute, and displays the measured value.

17 Claims, 16 Drawing Sheets

301

| ID | NAME | DISPLAY HIERARCHY |
|---|---|---|
| 1 | FARM FIELD SPECIFIC | FARM FIELD>VARIETY>GRADE>BLOCK |
| 2 | VARIETY SPECIFIC | VARIETY>FARM FIELD>GRADE>BLOCK |
| 3 | GRADE SPECIFIC | GRADE>VARIETY>FARM FIELD>BLOCK |

FIG. 2

| ID | FARM FIELD | BLOCK | GRADE | VARIETY | YIELD |
|---|---|---|---|---|---|
| 1 | F1 | B-A1 | AA | Type-A | 10 |
| 2 | F1 | B-A2 | A | Type-A | 12 |
| 3 | F1 | B-B1 | B | Type-B | 8 |
| ⋮ | | | | | |
| 70 | F2 | B-Z1 | C | Type-C | 9 |

FIG. 3

| ID | NAME | DISPLAY HIERARCHY |
|---|---|---|
| 1 | FARM FIELD SPECIFIC | FARM FIELD>VARIETY>GRADE>BLOCK |
| 2 | VARIETY SPECIFIC | VARIETY>FARM FIELD>GRADE>BLOCK |
| 3 | GRADE SPECIFIC | GRADE>VARIETY>FARM FIELD>BLOCK |

FIG. 4A

| ID | SELECTION INFORMATION | 401 |
|---|---|---|
| 1 | FARM FIELD SPECIFIC | |

FIG. 4B

| ID | SELECTION INFORMATION | 402 |
|---|---|---|
| 1 | FARM FIELD SPECIFIC,F1 | |

FIG. 4C

| ID | SELECTION INFORMATION | 403 |
|---|---|---|
| 1 | FARM FIELD SPECIFIC,F1,Type-A | |

FIG. 4D

| ID | SELECTION INFORMATION | 404 |
|---|---|---|
| 1 | FARM FIELD SPECIFIC,F1,Type-A | |
| 2 | FARM FIELD SPECIFIC,F1,Type-A | |

FIG. 4E

| ID | SELECTION INFORMATION | 405 |
|---|---|---|
| 1 | FARM FIELD SPECIFIC | |
| ⋮ | ⋮ | |
| 5 | FARM FIELD SPECIFIC,F1,Type-C | |

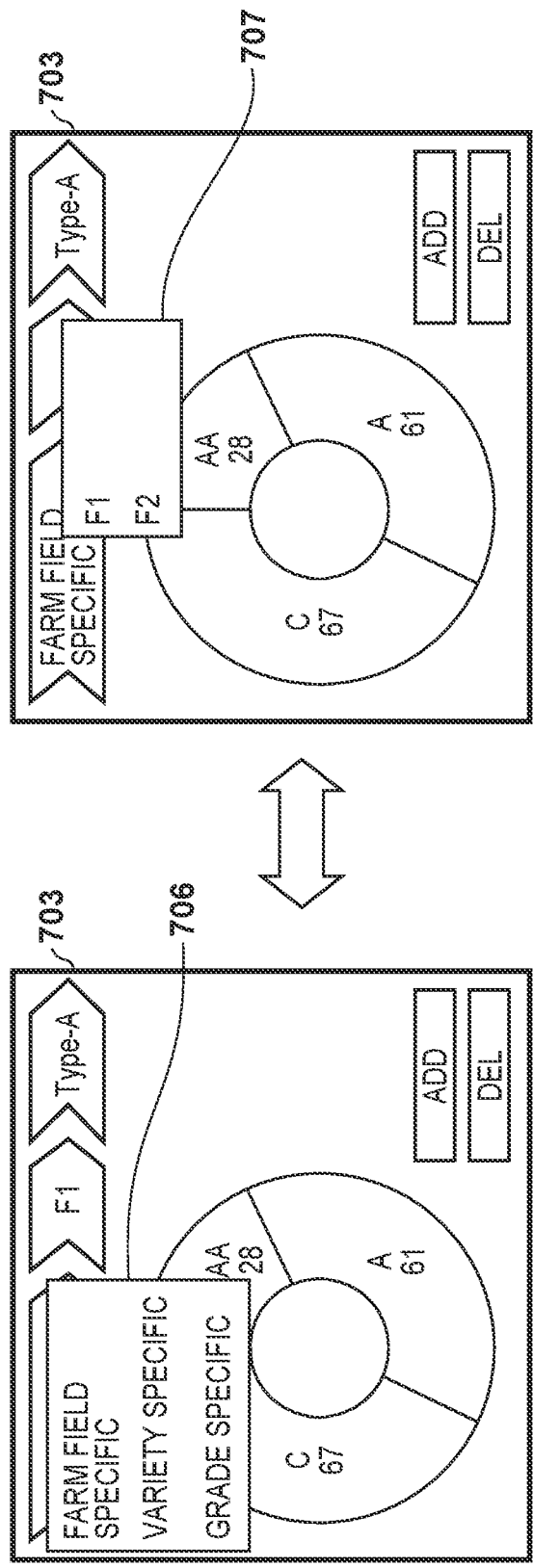

FIG. 8

| ID | FARM FIELD | BLOCK | GRADE | VARIETY | YIELD(TARGET) | YIELD(PREDICT) | YIELD(ACTUAL) |
|---|---|---|---|---|---|---|---|
| 1 | F1 | B-A1 | AA | Type-A | 10 | 11 | 12 |
| 2 | F1 | B-A2 | A | Type-A | 12 | 10 | 11 |
| 3 | F1 | B-B1 | B | Type-B | 8 | 7 | 6 |
| ... | | | | | | | |
| 70 | F2 | B-Z1 | C | Type-C | 9 | 8 | 7 |

801

| APPLICATION PURPOSE | SELECTION INFORMATION | |
|---|---|---|
| HARVESTING SITUATION | FARM FIELD SPECIFIC | 1101 |
| HARVESTING SITUATION | VARIETY SPECIFIC | |
| HARVESTING SITUATION | GRADE SPECIFIC | |
| ⋮ | ⋮ | |
| PRODUCT A | VARIETY SPECIFIC,Type-A | |
| PRODUCT A | VARIETY SPECIFIC,Type-A,F1,A | |
| PRODUCT A | VARIETY SPECIFIC,Type-A,F2,A | |
| ⋮ | ⋮ | |
| PRODUCT C | VARIETY SPECIFIC,Type-C,F2,C | |

F I G. 15A

| ID | FARM FIELD | BLOCK | GRADE | VARIETY | ... | YIELD (ACTUAL VALUE) | OPERATION SITUATION |
|---|---|---|---|---|---|---|---|
| 1 | F1 | B-A1 | AA | Type-A | ... | 12 | HARVESTED |
| 2 | F1 | B-A2 | A | Type-A | ... | — | UNHARVESTED |
| 3 | F1 | B-B1 | B | Type-B | ... | 4 | PARTIALLY HARVESTED |
| ... | | | | | ... | | |
| 70 | F2 | B-Z1 | C | Type-C | ... | 8 | HARVESTED |

| ID | FARM FIELD | BLOCK | GRADE | VARIETY | ... | YIELD (PREDICT SPROUT) | YIELD (PREDICT FLOWER) | ... |
|----|------------|-------|-------|---------|-----|------------------------|------------------------|-----|
| 1 | F1 | B-A1 | AA | Type-A | ... | 10 | 11 | ... |
| 2 | F1 | B-A2 | A | Type-A | ... | 12 | — | ... |
| 3 | F1 | B-B1 | B | Type-B | ... | 8 | 7 | ... |
| ... | | | | | | | | |
| 70 | F2 | B-Z1 | C | Type-C | ... | 9 | — | ... |

DISPLAY APPARATUS, CONTROL METHOD THEREOF, AND NON-TRANSITORY COMPUTER-READABLE STORAGE MEDIUM

BACKGROUND OF THE INVENTION

Field of the Invention

The present invention relates to a display technique for information concerning a farm field.

Description of the Related Art

In an agricultural field, recently, an apparatus for displaying a yield in each block of a farm field has been proposed. For example, Japanese Patent Laid-Open No. 2018-151770 (to be referred to as literature 1 hereinafter) discloses displaying a yield in each block on a map in a superimposed manner. However, in a large-scaled farm, crops are cultivated in a plurality of farm fields, and the number of blocks is large. For this reason, if the yield in each block is simply displayed, the information amount is too large, and it is difficult to grasp the harvesting situation. As a possible method, in a specific attribute such as a variety or grade of a crop in each block, yields in blocks where attribute values match are aggregated, and the aggregated yield is displayed for each attribute value.

For example, in Japanese Patent Laid-Open No. 2009-245128 (to be referred to as literature 2 hereinafter), in an attribute that a user has designated from a list, numerical data of items whose attribute values match are aggregated, and the value aggregated for each attribute value is displayed on a first graph. Patent literature 2 also discloses that the user can designate an attribute value on the first graph, and a second graph is displayed by targeting only items for which the designated attribute values match in all data.

In literature 2, when displaying the second graph as well, it is necessary to designate an attribute to display a graph, as in the case of the first graph. For this reason, to display the second graph in which the target data are narrowed down, it is necessary to designate two conditions, that is, "an attribute value to narrow down data" and "an attribute to be displayed on a graph".

In a large-scaled farm, to analyze the harvesting situation, it is necessary to display a number of graphs under various conditions, for example, a yield for each variety of a specific grade and a yield in each farm field for a specific variety. Hence, in the method as described in literature 2, if the number of graphs is large, the labor to designate the conditions is also large.

SUMMARY OF THE INVENTION

The present invention has been made in consideration of the above-described problem, and provides a technique capable of easily displaying various graphs while saving a labor to designate conditions to display a graph.

According to an aspect of the invention, there is provided a display apparatus comprising: an acquisition unit configured to acquire data representing a measured value concerning a cultivation situation in each block that is a management unit of a crop cultivated in a farm field, with which a plurality of attributes concerning one of a type of the crop and a place to cultivate the crop are associated; and a display control unit configured to display a result of aggregating the measured value for each attribute value of one of the plurality of attributes of the data acquired by the acquisition unit, wherein in a state in which the result of aggregating the measured value represented by the data for each attribute value of a first attribute included in the plurality of attributes is displayed, if a first attribute value of the first attribute is selected by a user, the display control unit aggregates the measured value represented by the data, which has the first attribute value, for each attribute value of a second attribute that is an attribute included in the plurality of attributes and different from the first attribute, and displays the measured value, and in a state in which the result of aggregating the measured value represented by the data for each attribute value of the second attribute is displayed, if a second attribute value of the second attribute is selected by the user, the display control unit aggregates the measured value represented by the data, which has the second attribute value of the second attribute, for each attribute value of the first attribute, and displays the measured value.

According to the present invention, it is easy to designate conditions to display a graph.

Further features of the present invention will become apparent from the following description of exemplary embodiments (with reference to the attached drawings).

BRIEF DESCRIPTION OF THE DRAWINGS

FIG. 2 is a view showing an example of a table of block information;

FIG. 3 is a view showing an example of a display hierarchy table;

FIGS. 4A to 4E are views showing examples of a table of selection information;

FIGS. 7A to 7C are views showing examples in which attribute values and yields are displayed on graphs;

FIG. 8 is a view showing an example of a table including the target values, predicted values, and actual values of yields;

FIGS. 15A and 15B are views showing examples of a table of block information in which the values of yields are not set.

DESCRIPTION OF THE EMBODIMENTS

Figure 1A:
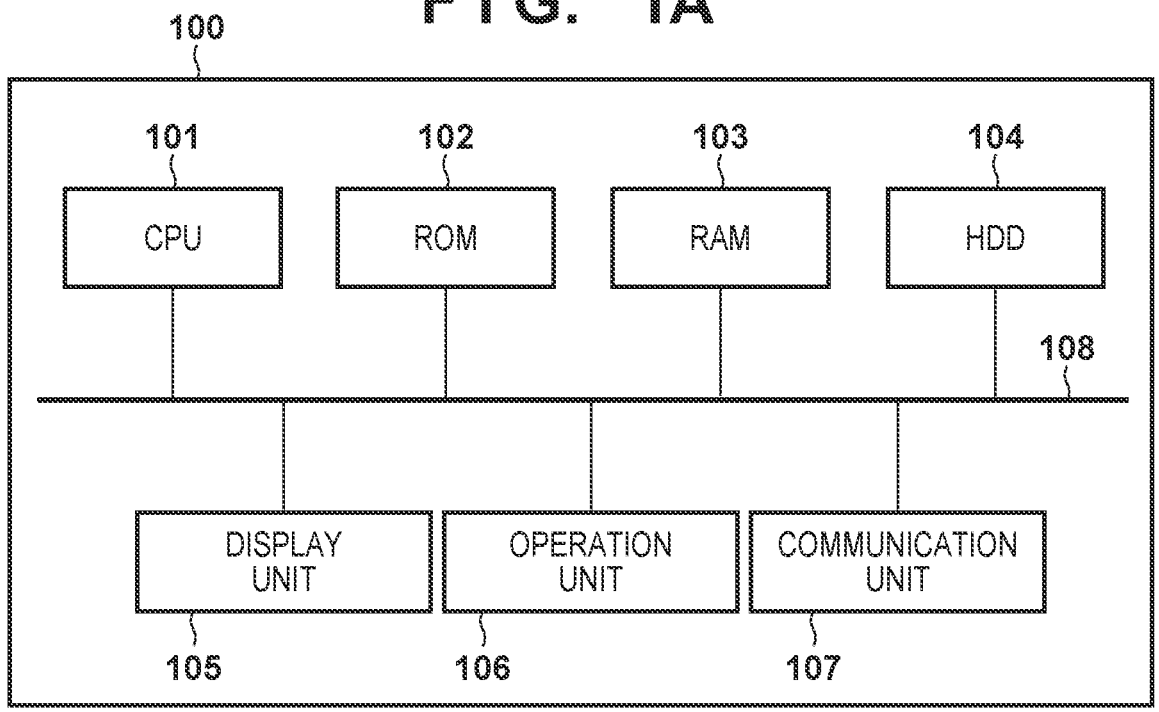
FIG. 1A is a block diagram showing the hardware of a display apparatus configured to display a yield.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the embodiment, an example of an application to a display apparatus that displays a yield in each partial block in a farm field where crops are cultivated will be described. Note that a management unit in a farm field will be referred to as a block hereinafter. In this embodiment, a yield will be handled as a value (measured value) linked with a block. However, another value such as the degree of ripeness of a crop may be used.

FIG. 1A is a block diagram showing the hardware arrangement of a display apparatus 100 according to this embodiment. As shown in FIG. 1A, the display apparatus 100 includes a CPU 101, a ROM (Read-Only Memory) 102, a RAM (Random Access Memory) 103, an HDD 104, a display unit 105, an operation unit 106, and a communication unit 107.

The CPU 101 is a central processing unit, which performs calculations, logic judgments, and the like for various kinds of processing and controls constituent elements connected to a system bus 108. The ROM 102 is a program memory and stores programs including various kinds of processing procedures to be described later and used for control by the CPU 101. The RAM 103 is used as a temporary storage area such as the main memory or work memory of the CPU 101. Note that the program memory may be implemented by loading a program from an external storage device connected to the display apparatus 100 into the RAM 103.

The HDD 104 is a hard disk configured to store electronic data and programs according to this embodiment. An external storage device may be used as a device that plays a similar role. Here, the external storage device can be implemented by, for example, a medium (recording medium), and an external storage drive configured to implement access to the medium. As such a medium, for example, a flexible disk (FD), a CD-ROM, a DVD, a USB memory, an MO, a flash memory, and the like are known. In addition, the external storage device may be a server apparatus connected via a network.

The display unit 105 is, for example, a CRT display or a liquid crystal display, and is a device that outputs an image to a display screen. Note that the display unit 105 may be an external device connected to the display apparatus 100 by wire or wirelessly. The operation unit 106 includes a keyboard or a mouse, and accepts various kinds of operations by a user. The communication unit 107 performs wired or wireless two-way communication with another information processing apparatus, a communication device, an external storage device, or the like by a known communication technique.

Figure 1B:
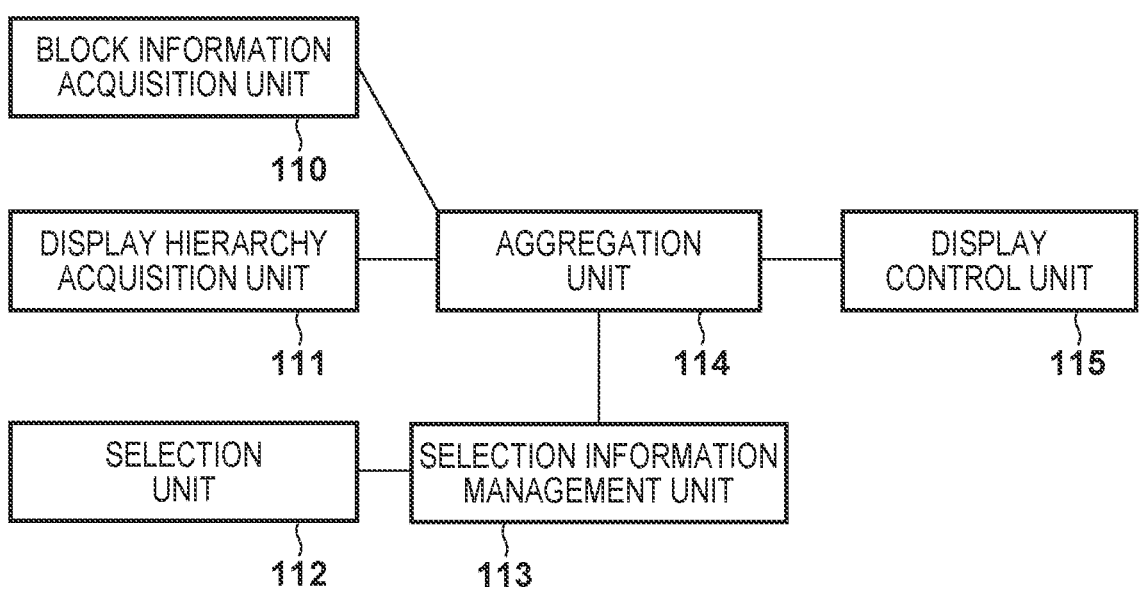
FIG. 1B is a block diagram showing the functional block arrangement of the display apparatus shown in FIG. 1A.

FIG. 1B is an example of a block diagram showing the functional arrangement of the display apparatus 100. These functional units are implemented when the CPU 101 loads programs stored in the ROM 102 (or the HDD 104) into the RAM 103 and executes processing according to flowcharts to be described later. The execution result of each processing is held in the RAM 103. Additionally, for example, if hardware is constructed in place of software processing using the CPU 101, calculation units and circuits corresponding to the processing of the functional units to be described here are constituted.

A block information acquisition unit 110 acquires attribute information and a yield in each block of a farm field. A display hierarchy acquisition unit 111 acquires, as a display hierarchy, layers of attributes to be displayed. A selection unit 112 accepts a user operation via the operation unit 106 and selects a display hierarchy or an attribute value. A selection information management unit 113 manages, as selection information, a list of display hierarchies and attribute values selected by the selection unit 112. An aggregation unit 114 aggregates yields on an attribute value basis by an attribute specified based on a display hierarchy by targeting blocks in which the lists of attribute values match in the order of attributes of the display hierarchy. A display control unit 115 displays, on the display unit 105, the yields on the attribute value basis, which are aggregated by the aggregation unit 114.

Figures 7A, 7B:
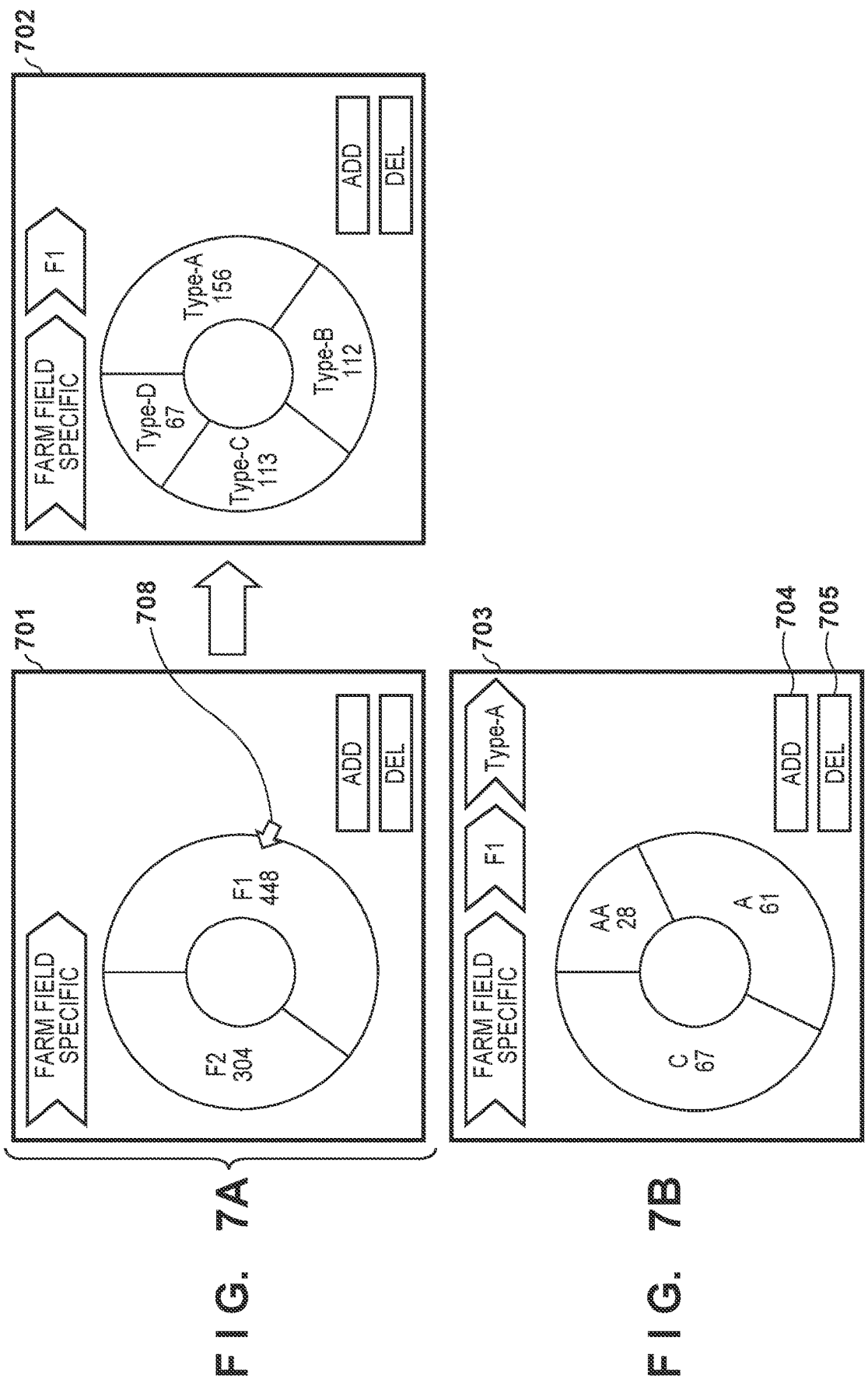

Reference numeral 701 in FIG. 7A shows an example in which a yield aggregated for each farm field is displayed in a pie chart. In this embodiment, a farm field is one of the attributes of a block, and the name (here, F1 or F2) of a farm field is the attribute value of the farm field. Note that another graph such as a bar chart may be used in place of the pie chart, or instead of using a graph, the yields may be displayed as a list using a text.

FIG. 2 shows an example of a table of block information acquired by the block information acquisition unit 110. A block information table 201 is formed by an ID, a farm field, a block, a grade, a variety, and a yield. The farm field is the name of a farm field to which a block belongs, and the block is a name assigned to a block. The grade and the variety are the names of the grade and variety of a crop cultivated in a block. The yield is the yield of a crop harvested in a target block.

FIG. 3 shows an example of a table of display hierarchies acquired by the display hierarchy acquisition unit 111. A display hierarchy table 301 is formed by an ID, a name, and a display hierarchy. The name is a name representing a display hierarchy, and is used when the selection unit 112 selects a display hierarchy. The display hierarchy defines layers of attributes arranged in the layer order, and is used to specify an attribute to be aggregated by the aggregation unit 114.

FIGS. 4A to 4E show examples of a table of selection information managed by the selection information management unit 113. Each of selection information tables 401 to 405 shown in FIGS. 4A to 4E is formed by an ID and selection information. Selection information is a list of a display hierarchy and attribute values selected by the selection unit 112 (the first value is the name of a display hierarchy, and the second and subsequent values form a list of attribute values).

The operation of the display apparatus according to this embodiment will be described next in accordance with a detailed processing procedure.

Figure 5:
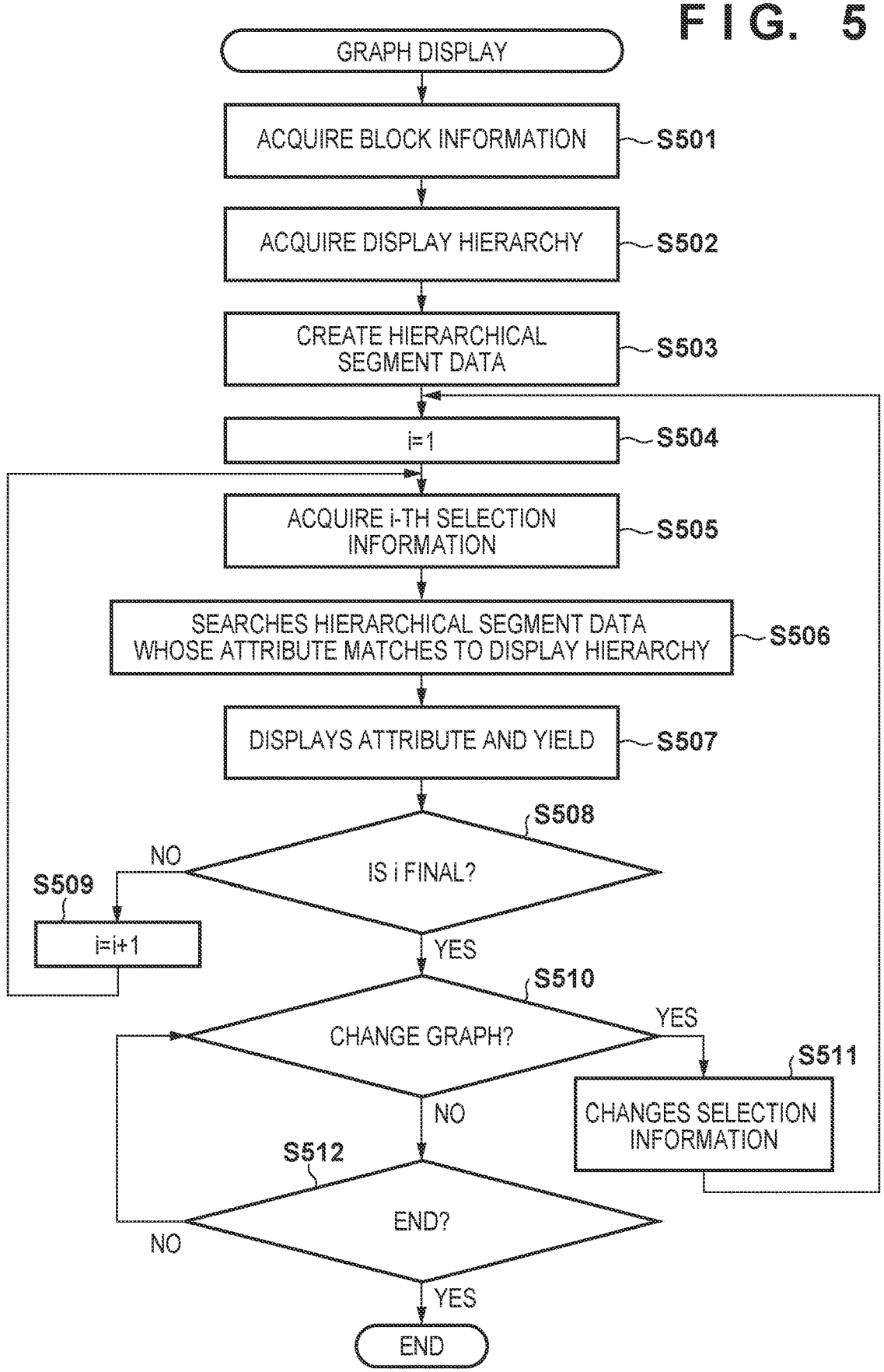
FIG. 5 is a flowchart showing an example of an operation of displaying a yield on a graph.

FIG. 5 is an example of a flowchart showing an operation of displaying a yield on a graph on an attribute value basis by the display apparatus 100. Steps of the flowchart will be explained below with S at the beginning of step numbers.

In step S501, the block information acquisition unit 110 acquires the block information table 201. In step S502, the display hierarchy acquisition unit 111 acquires the display hierarchy table 301. Note that the tables may be acquired from data stored in the HDD 104 in advance, or may be acquired from another information processing apparatus via the communication unit 107.

Figure 6:
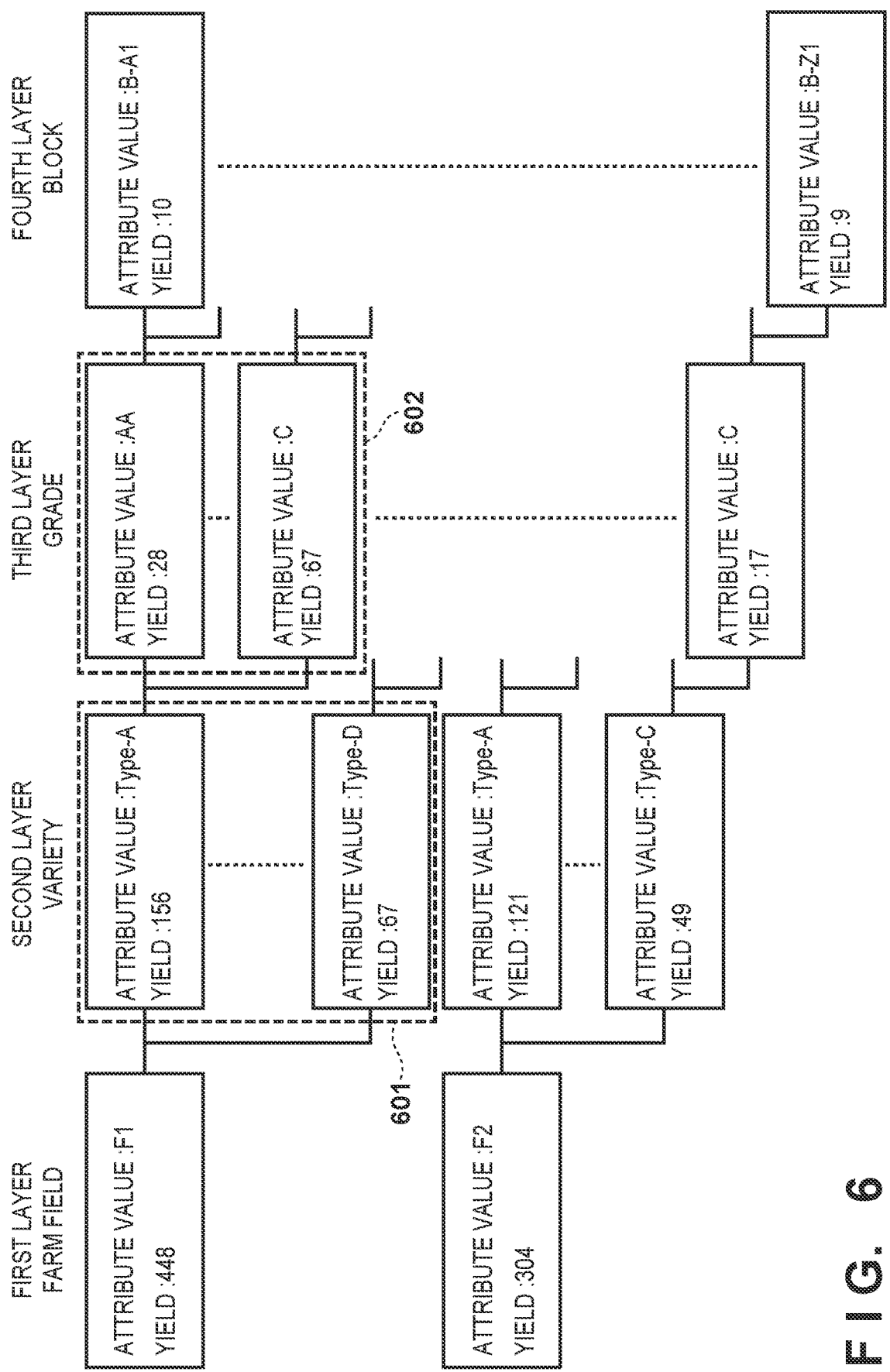
FIG. 6 is a view showing an example of hierarchical segment data used for aggregation.

In step S503, the aggregation unit 114 creates hierarchical segment data shown in FIG. 6 based on the block information table 201 acquired in step S501. Hierarchical segment data is created for each display hierarchy using the display hierarchies in the display hierarchy table 301 acquired in step S502.

Details of hierarchical segment data creation processing by the aggregation unit 114 in step S503 will be described here with reference to FIG. 6. The hierarchical segment data shown in FIG. 6 is created using the display hierarchy "farm field specific": "farm field>variety>grade>block" with an ID "1" (to be referred to as ID 1 hereinafter) in the display hierarchy table 301.

In the first layer, yields in blocks are aggregated for each attribute value of a farm field that is the attribute of a block. Here, the information of a pair of an attribute value and a yield will be referred to as segment data. In the first layer, two segment data (F1 and F2) are created. In the second layer, yields in blocks are aggregated for each attribute value of variety by targeting only the blocks used for aggregation in the segment data of the first layer that is the upper layer, and linked as child segment data. For example, reference numeral 601 represents a result of aggregating yields for each attribute value of variety by targeting only the block in which the attribute value of the attribute of the farm field is F1. In subsequent layers as well, aggregation is repeated until the block that is the attribute of the lowermost layer, thereby creating hierarchical segment data.

Referring back to the flowchart of FIG. 5, processing of displaying a graph using hierarchical segment data will be described with reference to steps S504 to S509.

In step S504, the CPU 101 initializes a variable i representing the ID of selection information to "1". In step S505, the selection information management unit 113 acquires ith selection information. Since selection information does not exist in the initial state, information to be displayed by default is prepared in advance. Here, the selection information table 401 is prepared to display a graph aggregated for each attribute value of farm field as indicated by reference numeral 701 in FIG. 7A by default.

In step S506, the aggregation unit 114 searches the hierarchical segment data corresponding to the display hierarchy of the selection information for segment data in which the lists of attribute values of the selection information match in the order of attributes of the layer, and acquires the child segment data of the found segment data. In the initial state, the selection information of ID 1 in the selection information table 401 represents that the display hierarchy is "farm field specific", and no attribute value exists. The aggregation unit 114 acquires the two segment data F1 and F2 in the first layer from the hierarchical segment data shown in FIG. 6, which is created using the display hierarchy "farm field specific".

In step S507, the display control unit 115 displays the attribute values and the yields of the segment data acquired in step S506 in a graph. Reference numeral 701 in FIG. 7A shows an example in which the segment data in which the attribute values are F1 and F2 are displayed. In step S508, the CPU 101 determines whether the variable i represents final selection information. If the selection information is not final, the CPU 101 advances to next selection information in step S509 and repeats the processes of steps S505 to S507.

With the above-described processing, graphs are displayed numbering as many as the number of selection information registered in the selection information table. Note that to display graphs for three display hierarchies "farm field specific", "variety specific", and "grade specific" by default, selection information obtained by setting selection information "variety specific" to ID 2 of the selection information table 401 and selection information "grade specific" to ID 3 is used.

Steps S510 to S511 are processes performed in a case in which an instruction to change a graph is input by a user operation for a displayed graph. In step S510, the CPU 101 determines whether to accept a user operation via the operation unit 106 and change a graph. Upon accepting an operation of changing a graph, in step S511, the CPU 101 causes the selection information management unit 113 to change selection information under management, and executes processing of displaying the graph again based on the changed selection information in step S504 to S509.

In step S512, the CPU 101 determines whether an operation of ending display of the graph, for example, pressing an end button is accepted, and accepts the operation of changing the graph in step S510 until the end.

A detailed state in which selection information is changed in step S510 to S511 and the changed graph is displayed in steps S504 to S509 will be described here with reference to FIGS. 4A to 4E, 6, and 7A to 7C.

Based on the selection information table 401, the CPU 101 displays the graph denoted by reference numeral 701 in FIG. 7A, as described above. If the CPU 101 accepts, in step S510, an operation of moving a mouse cursor 708 to the attribute value of the farm field F1 displayed in the graph and clicking (the operation by the user concerning mouse cursor movement and mouse clicking will simply be referred to as an operation, a selection operation, or the like hereinafter), F1 is added to the selection information, as in the selection information table 402, in step S511. In steps S504 to S509, the CPU 101 acquires the segment data denoted by reference numeral 601 in FIG. 6 and displays a graph 702 in FIG. 7A. Furthermore, if a selection operation for Type-A that is an attribute value of variety is accepted, the CPU 101 acquires segment data denoted by reference numeral 602 in FIG. 6 in accordance with the selection information table 403, and displays a graph 703 in FIG. 7B on the display unit 105.

A state in which the number of graphs to be displayed is changed by adding or deleting a graph will be described next. Reference numeral 704 in FIG. 7B denotes an addition button that instructs addition of a graph; and 705 denotes a deletion button that instructs deletion of a graph. If the CPU 101 detects an operation on the addition button 704 in step S510, in step S511, the selection information of ID 1 as the target graph is duplicated, and selection information of ID 2 is added, as in the selection information table 404. If the CPU 101 detects an operation on the deletion button 705 in step S510, in step S511, the CPU 101 deletes the selection information of the ID of the target graph from the table.

Another method of changing the graph will be described next. In FIG. 7C, selection information is displayed as a "breadcrumb list" on the upper area of the graph. Upon accepting a selection operation for a display hierarchy or an attribute value in the breadcrumb list in step S510, the CPU 101 displays a menu corresponding to the selected item, as indicated by reference numeral 706 or 707. If a selection operation for the menu is accepted, the selection information is changed. If the user selects "farm field specific" in the menu 706, the information of the display hierarchy is set to the selection information of ID 1 in the selection information table 403, as in the selection information table 401. If the user selects F1 that is the attribute value in the menu 707, the selection information of ID 1 in the selection information table 403 is changed to the information of the layer of the selected attribute value, as in the selection information table 402, and the information under the layer of the selected attribute value is discarded.

Note that if the user selects "variety specific" in the menu 706 in FIG. 7C, the display changes to graph display corresponding to hierarchical segment data created in accordance with ID2 of the display hierarchy table 301 shown in FIG. 3.

According to the above-described embodiment, selection information is changed, added, or deleted by accepting a user operation. The aggregation unit 114 aggregates yields for a specific attribute using the list of display hierarchies and attribute values of selection information. The display control unit 115 displays the yield on the attribute value basis on a graph using the aggregated data. This allows the user to display a graph in which yields are aggregated under various conditions.

Figure 14A:
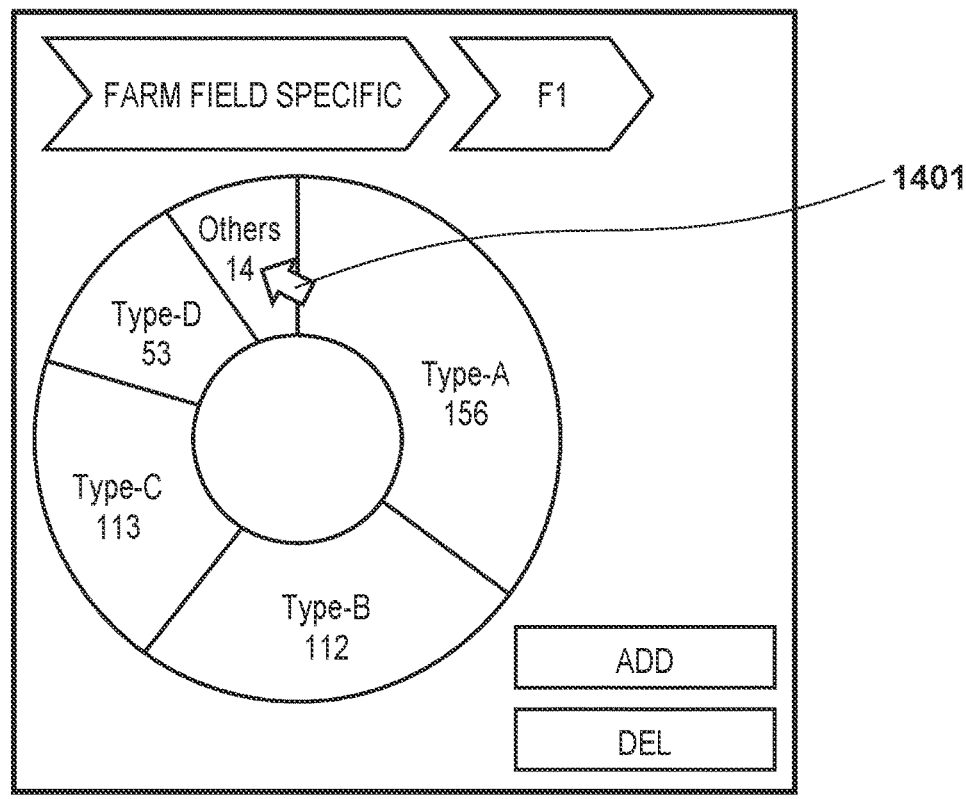
FIGS. 14A and 14B are views showing examples in which a plurality of segment data are displayed together on a graph.
Figure 14B:
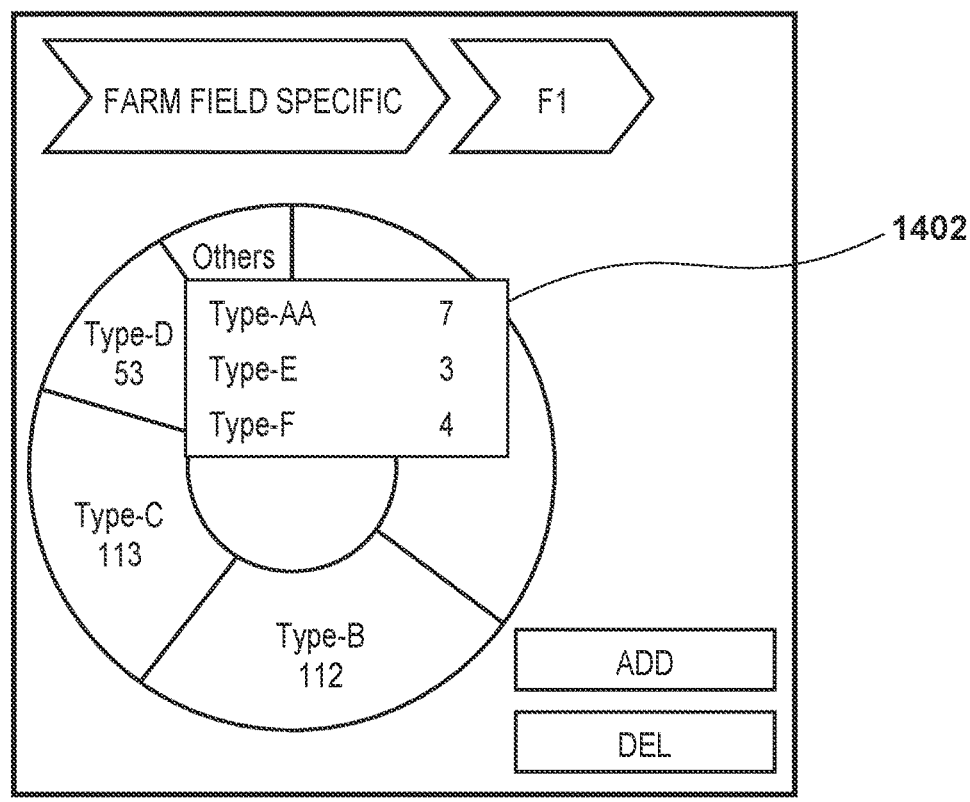

Note that in this embodiment, in step S507, the attribute values and the yields of all segment data are displayed on a graph. However, if the number of segment data is large, or if the values of yields in some segment data are extremely small, the display area may be too small. To cope with this, segment data of small yields may be put together into one data and displayed. FIGS. 14A and 14B show an example in which the yields of three segment data are added and put into one as Others. At this time, if the user selects Others by a mouse cursor 1401 to change the graph, the CPU 101 displays a menu 1402 including the attribute values and the yields of the three segment data. If a selection operation for an attribute value is accepted from the menu in step S510, the attribute value is added to the selection information in step S511, as described above.

First Modification of First Embodiment

In the first embodiment, a description has been made assuming that each block has one yield value. In the first modification, a case in which three values, that is, a target value, a predicted value, and an actual value are provided as the information of a yield will be described. A detailed description of the contents already described in the first embodiment will appropriately be omitted below.

FIG. 8 shows a block information table 801 according to the first modification. The block information table 801 holds three values, that is, a target value, a predicted value, and an actual value as information concerning a yield. An operation of displaying a graph using the block information table 801 will be described with reference to the flowchart of FIG. 5 according to the first embodiment.

In step S501, the block information acquisition unit 110 acquires the block information table 801. In step S502, the display hierarchy acquisition unit 111 acquires the display hierarchy table 301. In step S503, the aggregation unit 114 creates hierarchical segment data using the block information table 801 and the display hierarchy table 301. The hierarchical segment data shown in FIG. 6 has only one yield value. However, the aggregation unit 114 according to the first modification creates three hierarchical segment data corresponding to a target value, a predicted value, and an actual value for one display hierarchy in step S503. Note that one segment data may hold three pieces of information of the target value, the predicted value, and the actual value.

Figure 9:
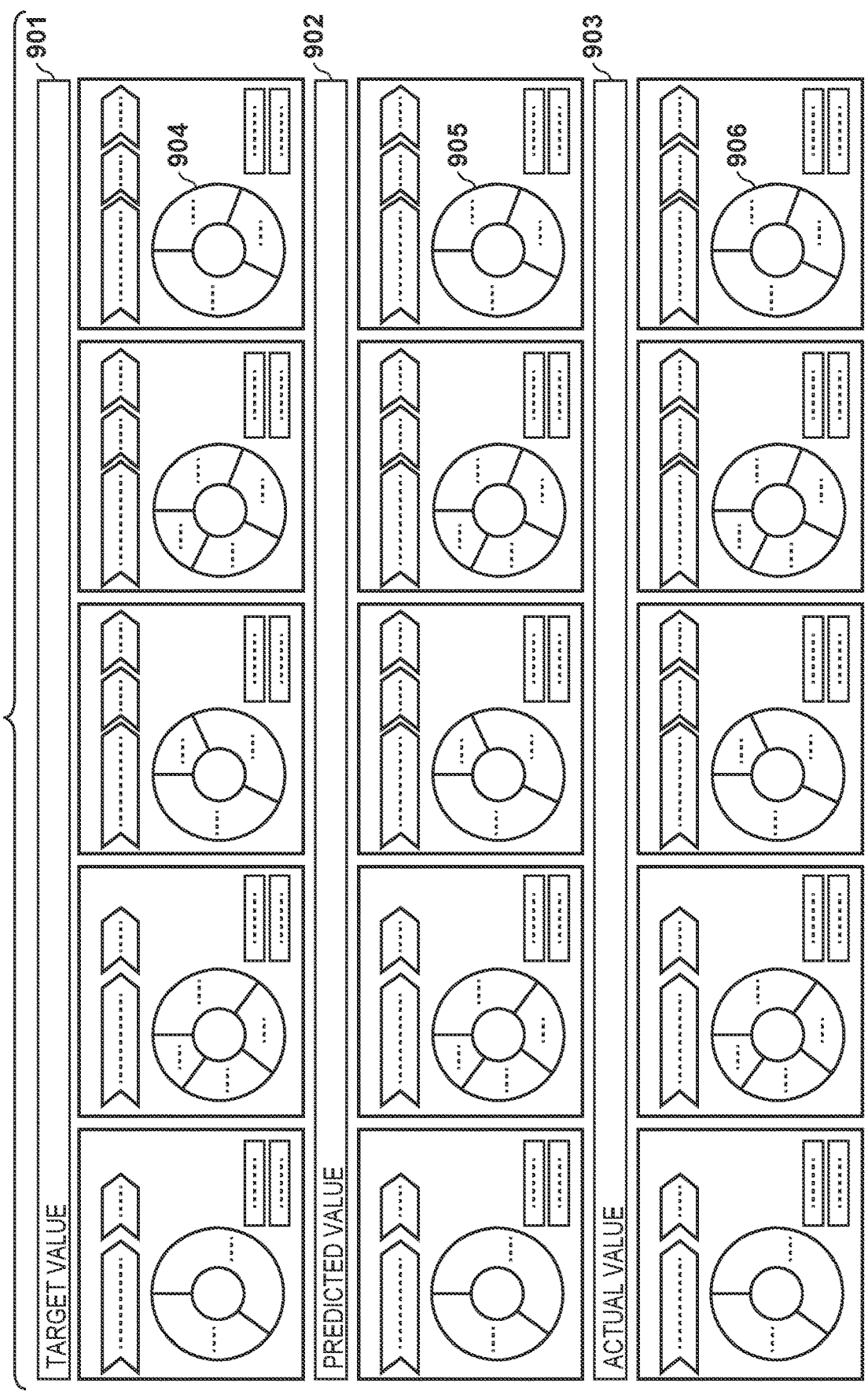
FIG. 9 is a view showing an example of graph display of the target values, predicted values, and actual values of yields.

In steps S504 to S509, graph display processing based on selection information is performed. Since the hierarchical segment data created in step S503 includes three pieces of yield information, in step S505, three graphs for the target value, the predicted value, and the actual value are displayed from one piece of acquired selection information. FIG. 9 is a view showing a state in which the display unit 105 displays the selection information of the selection information table 405 on graphs. Reference numerals 901 to 903 denote title bars representing a target value, a predicted value, and an actual value. Under each title bar, graphs of corresponding yield values are displayed.

In steps S510 and S511, graph change processing is performed. If the user changes the selection information in step S511, three graphs are changed in synchronism. For example, if the user changes the selection information of ID 5 in the selection information table 405, three graphs indicated by reference numerals 904 to 906 are changed.

As described above, according to the first modification, even if a plurality of yield values exist in one block, a yield aggregated for each value can be displayed on a graph. In addition, when the same selection information is used, graphs under the same condition can be displayed side by side. It is therefore possible to easily visually grasp how the yield has transitioned in the target, prediction, and actual result.

Note that to display different graphs without synchronization of the three graphs of the target value, the predicted value, and the display unit, three selection information tables may be prepared, and the graphs may be displayed or changed for the selection information of each value.

Second Embodiment

In the first embodiment and its first modification, a display apparatus that displays yields has been described. In the second embodiment, an example of a display system in which yields are displayed by cooperation of a terminal for an operator who performs an operation such as harvesting and a server that manages data will be described. Differences from the first embodiment will be described below.

Figures 10, 11:
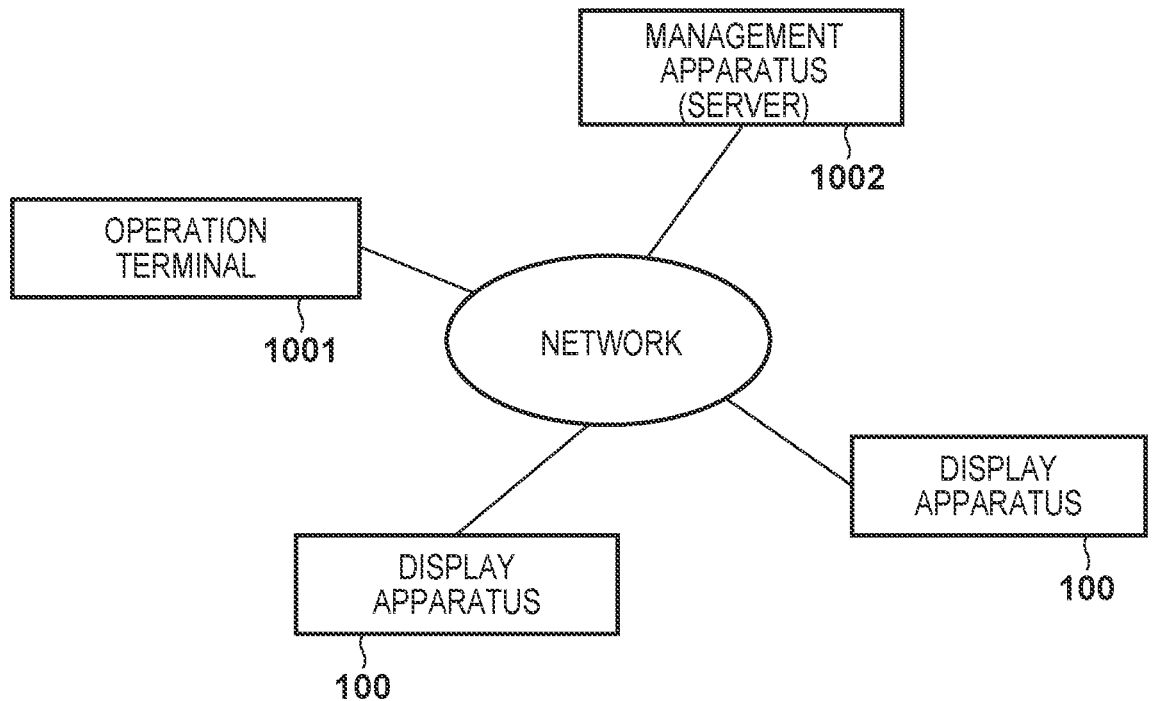
FIG. 10 is a block diagram showing the arrangement of a display system configured to display a yield.
FIG. 11 is a view showing an example of a table of application purpose specific selection information.

FIG. 10 is a block diagram showing the system arrangement of a display system according to the second embodiment. An operation terminal 1001 is a terminal for an operator, which is used by the operator to input information of a yield. The operation terminal 1001 transmits input information to a management apparatus 1002 via a network. The management apparatus 1002 stores and manages the received yield information as a block information table. Assume that the operation terminal 1001 and the management apparatus 1002 have a hardware arrangement similar to FIG. 1A.

Note that the management apparatus 1002 need not receive all pieces of yield information from the operation terminal 1001, and may receive these from a display apparatus 100 or another information processing apparatus. The operation terminal 1001 may transmit information necessary for calculation of a yield, and the management apparatus 1002 may calculate the yield based on the information. For example, the operation terminal 1001 may transmit the number of flowers, and the management apparatus 1002 may calculate the predicted value of the yield based on the number of flowers and manage the value on a block information table.

FIG. 11 shows an example of a table on which the management apparatus 1002 manages selection information for each application purpose of graph display. An application purpose specific selection information table 1101 includes the fields of an application purpose and selection information. The application purpose is an identifier used to put selection information together for each application purpose, and is the name of an application purpose. For example, selection information suitable for confirming a harvesting situation, selection information suitable when examining the ratio of a variety to be used in a specific product, and the like are managed in linkage with the names of application purposes.

Figure 12:
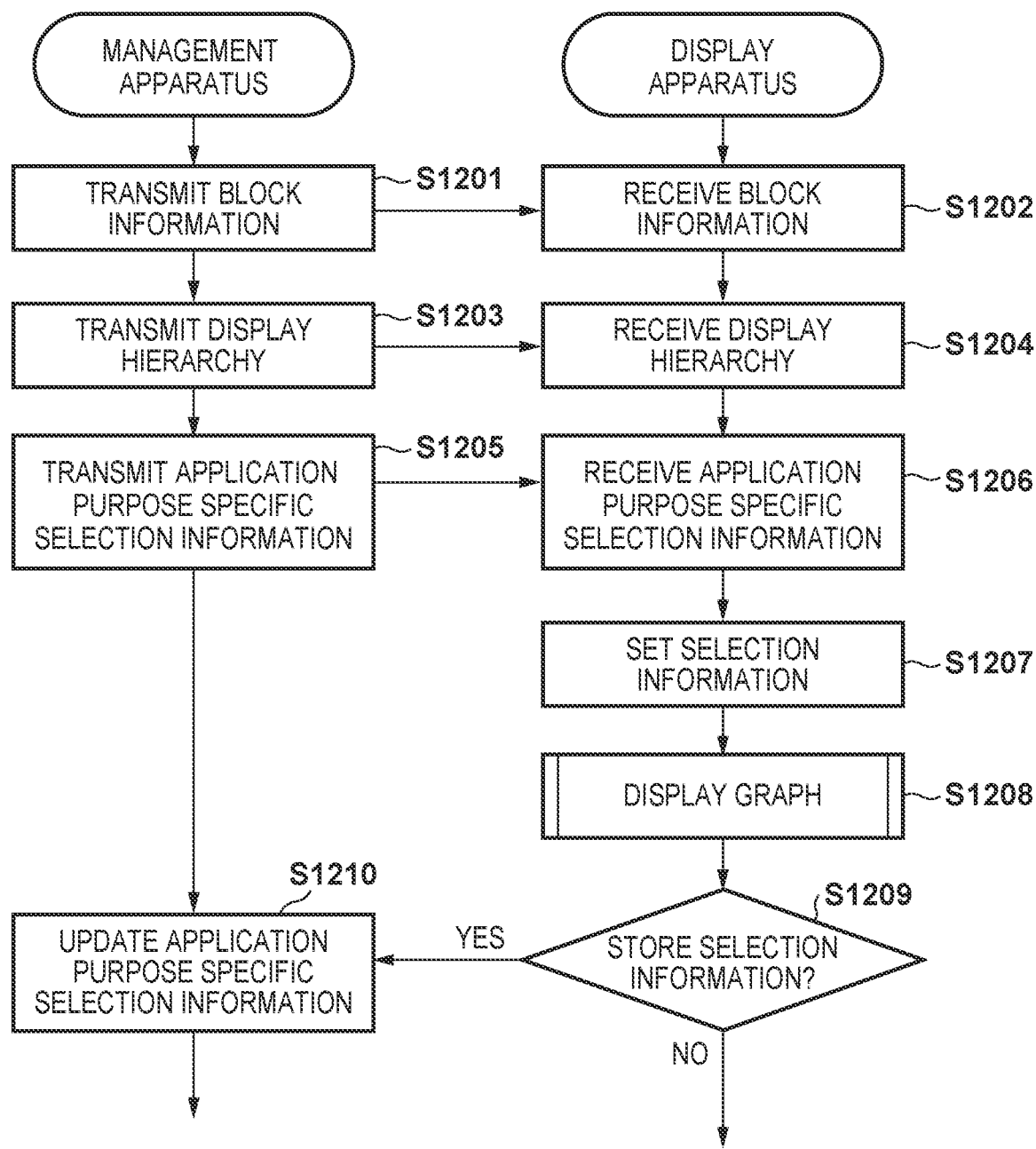
FIG. 12 is a sequence chart showing an example of an operation of displaying a graph suitable for an application purpose.

FIG. 12 is an example of a sequence chart showing an operation of the display apparatus 100 to receive selection information for each application purpose from the management apparatus 1002 and display a graph suitable for an application purpose. In steps S1201 and S1203, the data of a block information table 801 and a display hierarchy table 301 managed by the management apparatus 1002 are transmitted to the display apparatus 100. In steps S1202 and S1204, the display apparatus 100 stores the received data in a RAM 103 or an HDD 104.

Figure 13:
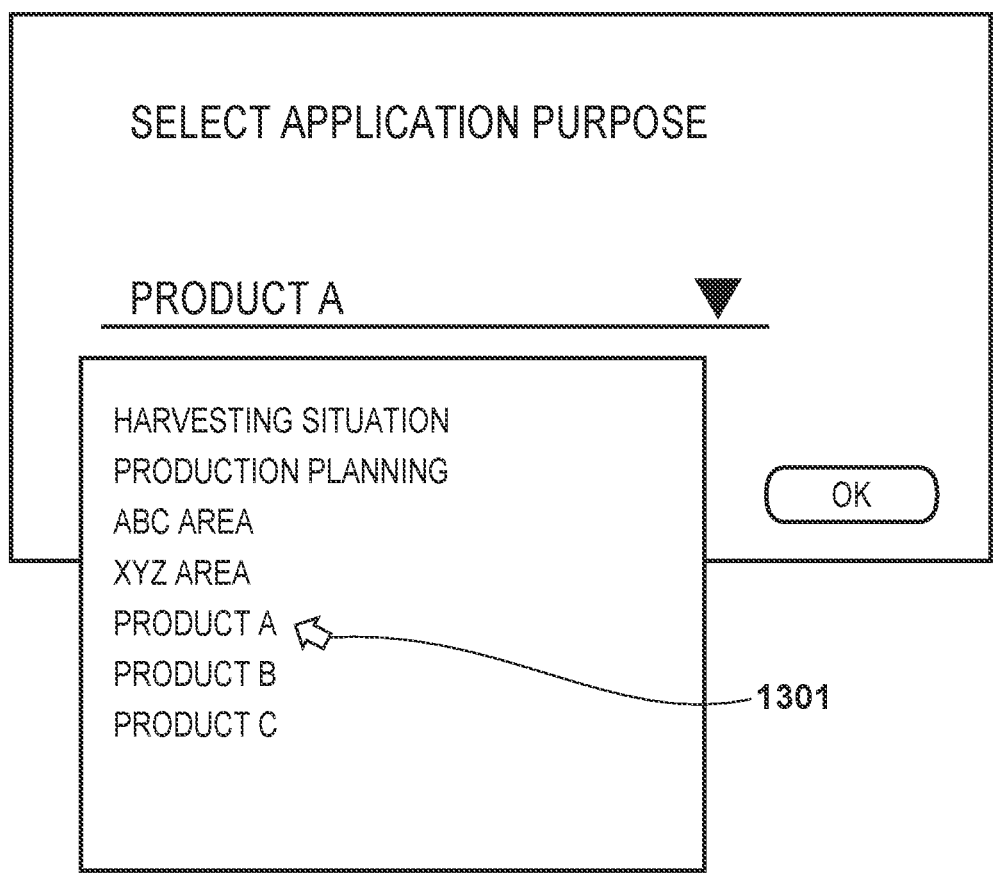
FIG. 13 is a view showing an example of a GUI configured to select an application purpose from a list.

In step S1205, the management apparatus 1002 transmits the managed application purpose specific selection information table 1101 to the display apparatus 100. In step S1206, the display apparatus 100 generates a list of application purposes from the received table and displays it on a display unit 105. Upon accepting selection of an application purpose via an operation unit 106, in step S1207, the display apparatus 100 sets the selection information of the selected application purpose to the selection information managed by the display apparatus 100. Reference numeral 1301 in FIG. 13 shows an example of a state in which an application purpose is selected from a list on the display unit 105 of the display apparatus 100.

In step S1208, the display apparatus 100 executes the procedure shown in FIG. 5 according to the first embodiment, thereby displaying, adding, or changing a graph. In step S1209, the display apparatus 100 determines whether a selection information storage instruction is input by the user. Upon determining that the storage instruction is input, the display apparatus 100 transmits the application purpose selected in step S1206 and the selection information corresponding to the graph added or changed in step S1208 to the management apparatus 1002. In step S1210, the management apparatus 1002 deletes the same selection information as the application purpose from the application purpose specific selection information table 1101, and newly sets the received application purpose and the selection information in the application purpose specific selection information table 1101. This can allow another display apparatus to share the selection information corresponding to the added or changed graph.

According to the above-described second embodiment, the display apparatus 100 receives selection information for each application purpose from the management apparatus 1002, and displays a graph based on the selection information of the selected application purpose. This allows the user to easily display a graph in which yields are aggregated under a condition suitable for the application purpose.

First Modification of Second Embodiment

In the second embodiment, yields are set for all blocks in the block information table managed by the management apparatus 1002. In the first modification, a case in which yields are not set in some blocks in the block information table will be described. A detailed description of the contents already described in the second embodiment will appropriately be omitted below.

A block information table 1501 shown in FIG. 15A is formed by adding the information of an operation situation to the block information table 801. The operation situation is information transmitted from the operation terminal 1001 as the situation of an operation in a target block, and managed on the block information table 1501 by the management apparatus 1002. For example, in the table shown in FIG. 15A, in the block of ID 2, there is no actual value of yield, and the operation situation represents "unharvested". In block of ID 3, there is an actual value of yield, but the operation situation represents "partially harvested", and a part to harvest still remains. An operation of displaying a graph in a case in which a block in which the value of a yield is undetermined is included will be described with reference to the flowchart of FIG. 5 according to the first embodiment.

Figure 16:
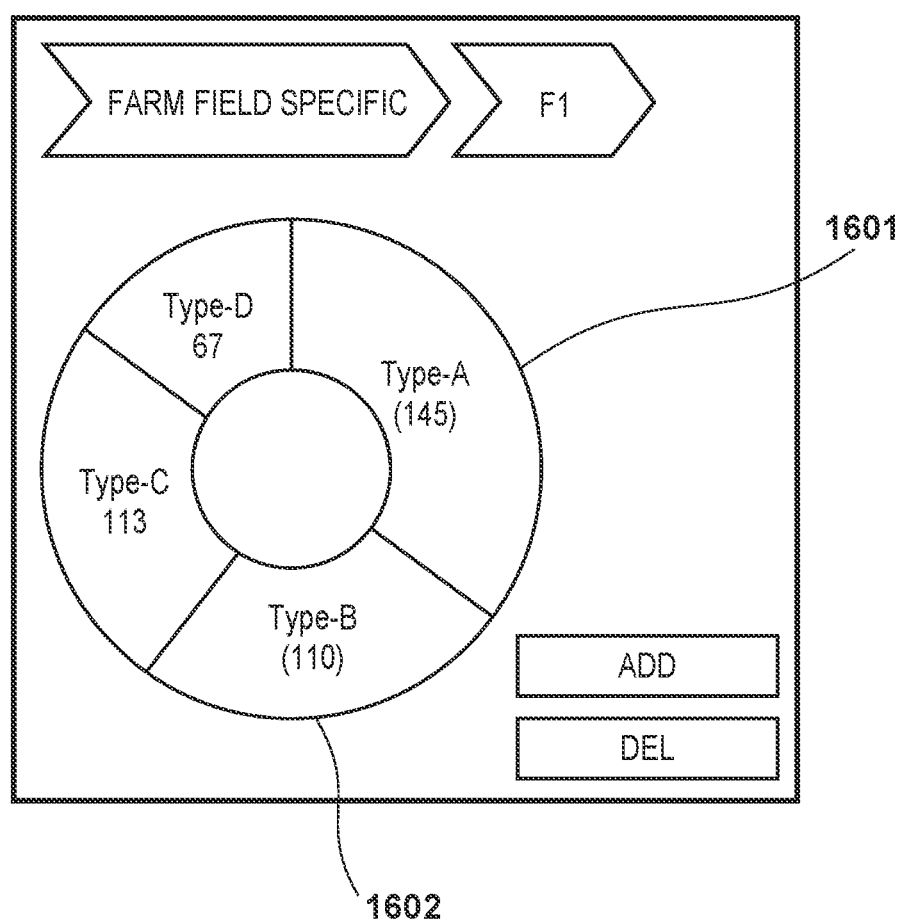
FIG. 16 is a view showing an example in which yields whose values are undetermined are displayed on a graph.

In step S501, a block information acquisition unit 110 acquires the block information table 1501. In step S502, a display hierarchy acquisition unit 111 acquires a display hierarchy table 301. In step S503, an aggregation unit 114 creates hierarchical segment data using the block information table 1501 and the display hierarchy table 301, which have been acquired. Segment data in the first embodiment has two values, that is, an attribute value and a yield. In the first modification, segment data further includes a non-determination flag. The non-determination flag is a flag representing whether a value in a block whose operation situation is not "harvested" is included when aggregating the yields. Steps S504 to S509 are processes of displaying a graph. When the segment data acquired in step S506 is displayed is step S507, the yield display method changes depending on the value of the non-determination flag. For example, reference numeral 1601 in FIG. 16 indicates that a block whose operation situation is "unharvested" is included, and reference numeral 1602 indicates that a block whose operation situation is "partially harvested" is included. Hence, these values are displayed in parentheses.

As described above, according to the first modification of the second embodiment, the method of displaying yields to be displayed on a graph is changed depending on the value of the non-determination flag. This allows the user to know whether a displayed yield increases by an operation in the future.

Note that in this embodiment, the block information table 1501 is made to hold the information of the operation situation. However, the operation situation may be judged based on the value of a yield such that, for example, if the value of a yield exists, the operation situation may be judged as "harvested", and if no value exists, the operation situation may be judged as "unharvested".

Second Modification of Second Embodiment

In the second embodiment and its first modification, the block information table managed by the management apparatus 1002 has one predicted value of a yield in each block. To predict the yield, in general, an investigation is performed while changing the target to buds or flowers of a crop in accordance with the time period, and the yield is calculated based on the result. In the second modification, a case in which the predicted value of a yield is managed for each target using prediction will be described. A detailed description of the contents already described in the second embodiment and its first modification will appropriately be omitted below.

In a block information table 1502 shown in FIG. 15B, the predicted value of a yield in the block information table 801 is divided into two predicted values, that is, a predicted value calculated based on the number of buds of a crop and a predicted value calculated based on the number of flowers, and the values are arranged in time series in the order of buds and flowers. In the block of ID 1, a predicted value based on the number of flowers is set. In the block of ID 2, only a predicted value based on the number of buds is set, and a predicted value based on the number of flowers is not set. An operation of displaying a graph in case in which the value of a yield is set stepwise will be described with reference to the flowchart of FIG. 5 according to the first embodiment.

In step S501, the block information acquisition unit 110 acquires the block information table 1502. In step S502, the display hierarchy acquisition unit 111 acquires the display hierarchy table 301. In step S503, the aggregation unit 114 creates hierarchical segment data using the block information table 1502 and the display hierarchy table 301, which have been acquired. When creating hierarchical segment data for the predicted values of yields, a predicted value based on the number of flowers, which is newer information, is preferentially used as a yield to be aggregated. If a predicted value based on the number of flowers does not exist, a predicted value based on the number of buds is used. To cope with a case in which neither predicted values exist, a non-determination flag may be used as in the first modification of the second embodiment.

In steps S504 to S509, a grade is displayed based on the hierarchical segment data created in step S503.

As described above, according to the second modification of the second embodiment, if a plurality of values are provided as the predicted value of a yield or the like, hierarchical segment data is created using newer information, thereby displaying a graph. This makes it possible to confirm the yield on a graph even in a case in which the value of the yield is set stepwise in accordance with the operation situation.

Note that when aggregating in step S503, until all predicted values based on the number of flowers are obtained, predicted values based on the number of buds may be used so predicted values predicted by a plurality of investigation methods do not mix. In addition, which predicted value is to be used may be decided in accordance with the time period, and the decided predicted values may simply be used such that, for example, the number of buds is used in April, and the number of flowers is used in May. Alternatively, if predicted values decided in accordance with the time period are not present, predicted values during the immediately preceding time period may be used. In this case, a flag may be added to segment data as in the first modification of this embodiment, to determine whether the predicted values during the preceding time period are used. If the predicted values during the preceding time period are included in the aggregated yield, numerical values with asterisks may be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-143921, filed Aug. 5, 2019, which is hereby incorporated by reference herein in its entirety.

What is claimed is:

1. A display apparatus comprising:
   a processor;
   a memory storing instructions which, when read and executed by the processor, cause the display apparatus to function as a plurality of units comprising:
   (1) an acquisition unit configured to acquire data representing a measured value concerning a cultivation situation in each block that is a management unit of a crop cultivated in a farm field, with which a plurality of attributes concerning one of a type of the crop and a place to cultivate the crop are associated; and
   (2) a display control unit configured to display a result of aggregating the measured value for each attribute value of one of the plurality of attributes of the data acquired by the acquisition unit,
   wherein the display control unit displays the result of aggregating the measured value for each attribute value as one of a pie chart and a bar chart,
   wherein the plurality of attributes includes at least two of (a) a type of the farm field, (b) a variety of the crop, (c) identification information of the block, and (d) a grade of the crop,
   wherein in a state in which the result of aggregating the measured value represented by the data for each attribute value of a first attribute included in the plurality of attributes is displayed, if a first attribute value of the first attribute is selected by a user, the display control unit aggregates the measured value represented by the data, which has the first attribute value, for each attribute value of a second attribute that is an attribute included in the plurality of attributes and different from the first attribute, and displays the measured value according to a first hierarchical relationship,
   wherein in a state in which the result of aggregating the measured value represented by the data for each attribute value of the second attribute is displayed, if a second attribute value of the second attribute is selected by the user, the display control unit aggregates the measured value represented by the data, which has the second attribute value of the second attribute, for each attribute value of the first attribute, and displays the measured value according to a second hierarchical relationship, wherein the display control unit can display a first information indicating the first hierarchical relationship and a second information indicating the second hierarchical relationship, wherein in a state in which the display control unit is displaying based on the first hierarchical relationship, if the second information is selected by the user, the display control unit performs display based on the second hierarchical relationship, and wherein in a state in which the display control unit is displaying based on the second hierarchical relationship, if the first information is selected by the user, the display control unit performs display based on the first hierarchical relationship.

2. The apparatus according to claim 1, wherein in the state in which the result of aggregating the measured value represented by the data for each attribute value of the second attribute is displayed, if the second attribute value of the second attribute is selected by the user, the display control unit aggregates the measured value represented by the data, which has the second attribute value of the second attribute, for each attribute value of a third attribute that is an attribute different from the first and second attributes, and displays the measured value according to the first hierarchical relationship.

3. The apparatus according to claim 2, wherein if the data having the first attribute value is aggregated for each attribute value of the second attribute and displayed, the display control unit displays information representing the first attribute value as a filtering condition.

4. The apparatus according to claim 2, wherein if the data having the first attribute value is aggregated for each attribute value of the second attribute and displayed, the display control unit displays information representing the first attribute value as a filtering condition.

5. The apparatus according to claim 4, wherein the display control unit displays an attribute value to be displayed as the filtering condition in a breadcrumb list format.

6. The apparatus according to claim 1, wherein the measured value is one of a yield and a degree of ripeness of the crop.

7. The apparatus according to claim 1, wherein the measured value represented by the data has a plurality of values for each block.

8. The apparatus according to claim 1, wherein the measured value represented by the data has a target value, a predicted value, and an actual value for each block.

9. The apparatus according to claim 1, wherein the display control unit aggregates the measured value represented by the data, which has the first attribute value, for each attribute value of the second attribute that is an attribute included in the plurality of attributes and different from the first attribute, and displays the measured value.

10. The apparatus according to claim 1, wherein the display control unit increases the number of displayed aggregation results of the measured value represented by the data for each attribute value in accordance with an instruction by the user.

11. The apparatus according to claim 1, wherein the plurality of units further comprises a selection unit configured to select, based on the user instruction, an application purpose of the measured value represented by the data, and wherein the display control unit aggregates the measured value represented by the data having an attribute value associated with the application purpose selected by the selection unit and displays the measured value.

12. The apparatus according to claim 11, wherein the selection unit selects the application purpose based on information based on the user instruction received from another apparatus.

13. The apparatus according to claim 11, wherein the data includes an attribute representing whether the crop is unharvested in the block, and wherein the display control unit displays, in different display modes, a result of aggregating including the measured value having an attribute value representing that the crop is unharvested and a result of aggregating without including the measured value having the attribute value representing that the crop is unharvested.

14. The apparatus according to claim 1, wherein the data includes an attribute representing whether the crop is unharvested in the block, and wherein the display control unit displays, in different display modes, a result of aggregating including the measured value having an attribute value representing that the crop is unharvested and a result of aggregating without including the measured value having the attribute value representing that the crop is unharvested.

15. The apparatus according to claim 1, wherein in a state in which the result of aggregating the measured value represented by the data for each attribute value of a third attribute included in the plurality of attributes is displayed, if a third attribute value of the third attribute is selected by a user, the display control unit aggregates the measured value represented by the data, which has the third attribute value, for each attribute value of a second attribute that is an attribute included in the plurality of attributes and different from the third attribute, and displays the measured value according to a third hierarchical relationship, wherein the display control unit can display a third information indicating the third hierarchical relationship, wherein in a state in which the display control unit is displaying based on the first hierarchical relationship, if the third information is selected by the user, the display control unit performs display based on the third hierarchical relationship, and wherein in a state in which the display control unit is displaying based on the second hierarchical relationship, if the third information is selected by the user, the display control unit performs display based on the third hierarchical relationship.

16. A method of controlling a display apparatus, the method comprising:

(a) acquiring data representing a measured value concerning a cultivation situation in each block that is a management unit of a crop cultivated in a farm field, with which a plurality of attributes concerning one of a type of the crop and a place to cultivate the crop are associated; and (b) displaying a result of aggregating the measured value for each attribute value of one of the plurality of attributes of the data acquired in the acquiring, wherein in the displaying, the result of aggregating the measured value for each attribute value is displayed as one of a pie chart and a bar chart, wherein the plurality of attributes includes at least two of (a) a type of the farm field, (b) a variety of the crop, (c) identification information of the block, and (d) a grade of the crop, wherein in a state in which the result of aggregating the measured value represented by the data for each attribute value of a first attribute included in the plurality of attributes is displayed, if a first attribute value of the first attribute is selected by a user, the displaying aggregates the measured value represented by the data, which has the first attribute value, for each attribute value of a second attribute that is an attribute included in the plurality of attributes and different from the first attribute, and displays the measured value according to a first hierarchical relationship, wherein in a state in which the result of aggregating the measured value represented by the data for each attribute value of the second attribute is displayed, if a second attribute value of the second attribute is selected by the user, the displaying aggregates the measured value represented by the data, which has the second attribute value of the second attribute, for each attribute value of the first attribute, and displays the measured value according to a second hierarchical relationship, wherein the displaying can display a first information indicating the first hierarchical relationship and a second information indicating the second hierarchical relationship, wherein in a state in which the displaying is displaying based on the first hierarchical relationship, if the second information is selected by the user, the displaying performs display based on the second hierarchical relationship, and wherein in a state in which the displaying is displaying based on the second hierarchical relationship, if the first information is selected by the user, the displaying performs display based on the first hierarchical relationship.

17. A non-transitory computer-readable storage medium storing a program which, when read and executed by a computer, causes the computer to execute the steps of a method of controlling a display apparatus, the method comprising:

(a) acquiring data representing a measured value concerning a cultivation situation in each block that is a management unit of a crop cultivated in a farm field, with which a plurality of attributes concerning one of a type of the crop and a place to cultivate the crop are associated; and (b) displaying a result of aggregating the measured value for each attribute value of one of the plurality of attributes of the data acquired in the acquiring, wherein in the displaying, the result of aggregating the measured value for each attribute value is displayed as one of a pie chart and a bar chart, wherein the plurality of attributes includes at least two of (a) a type of the farm field, (b) a variety of the crop, (c) identification information of the block, and (d) a grade of the crop, wherein in a state in which the result of aggregating the measured value represented by the data for each attribute value of a first attribute included in the plurality of attributes is displayed, if a first attribute value of the first attribute is selected by a user, the displaying aggregates the measured value represented by the data, which has the first attribute value, for each attribute value of a second attribute that is an attribute included in the plurality of attributes and different from the first attribute, and displays the measured value according to a first hierarchical relationship, and wherein in a state in which the result of aggregating the measured value represented by the data for each attribute value of the second attribute is displayed, if a second attribute value of the second attribute is selected by the user, the displaying aggregates the measured value represented by the data, which has the second attribute value of the second attribute, for each attribute value of the first attribute, and displays the measured value according to a second hierarchical relationship, wherein the displaying can display a first information indicating the first hierarchical relationship and a second information indicating the second hierarchical relationship, wherein in a state in which the displaying is displaying based on the first hierarchical relationship, if the second information is selected by the user, the displaying performs display based on the second hierarchical relationship, and wherein in a state in which the displaying is displaying based on the second hierarchical relationship, if the first information is selected by the user, the displaying performs display based on the first hierarchical relationship.

* * * * *